No. 746,514. PATENTED DEC. 8, 1903.
M. R. HUTCHISON.
ELECTRIC BATTERY.
APPLICATION FILED NOV. 15, 1902.
NO MODEL.

Witnesses
Inventor
Miller Reese Hutchison
By his Attorney

No. 746,514.

Patented December 8, 1903.

UNITED STATES PATENT OFFICE.

MILLER REESE HUTCHISON, OF NORWOOD, NEW JERSEY, ASSIGNOR TO HUTCHISON ACOUSTIC COMPANY, A CORPORATION OF NEW JERSEY.

ELECTRIC BATTERY.

SPECIFICATION forming part of Letters Patent No. 746,514, dated December 8, 1903.

Application filed November 15, 1902. Serial No. 131,550. (No model.)

*To all whom it may concern:*

Be it known that I, MILLER REESE HUTCHISON, a citizen of the United States, residing at Norwood, in the county of Bergen and State of New Jersey, have invented certain new and useful Improvements in Electric Batteries, of which the following is a full, clear, and exact description.

The invention relates to electric batteries, the object being to provide a construction for sealing and venting adapted either for primary or secondary batteries, whereby gases generated in the cell during the charging of a secondary cell or while a primary cell is on closed circuit will have a free escape, while the liquid solution will be effectually sealed in.

A further object of my invention is to provide ready means for replenishing the liquid solution that may have been evaporated or decomposed during the charging of the battery without destroying the sealing and venting characteristics.

It is well known that a "wet" cell is more serviceable and satisfactory than a "dry" cell, and if a wet cell can be so constructed as to avoid the escape of the solution it is generally preferable to use it. Cells which are intended to be carried upon the person—as, for instance, in the pocket—should in particular be constructed to obviate the escape of the solution, and it is to such cells that my invention is especially applicable, although not confined.

My improved construction will be fully described with reference to the accompanying drawings and pointed out in the appended claims.

Figure 1:
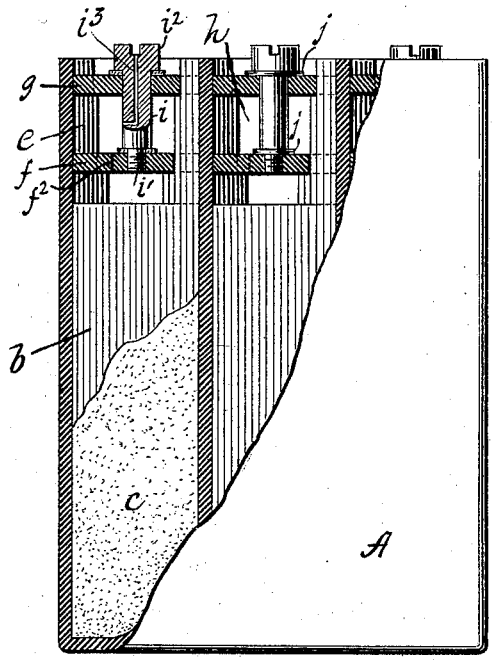
Figure 4:
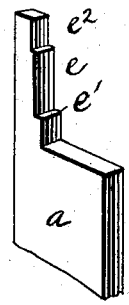
Figure 5:
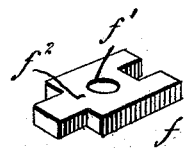
Figure 2:
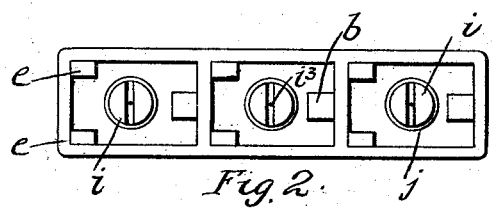
Figure 3:
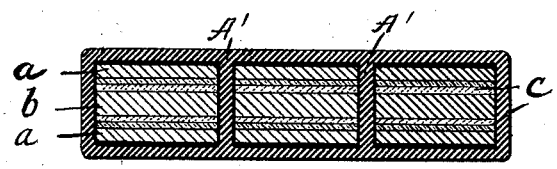

Figure 1 is a side elevation of a three-cell battery with parts broken away and in section. Fig. 2 is a plan of the same. Fig. 3 is a horizontal section through the body of the battery, and Figs. 4 and 5 are details.

The containing vessel A may be of hard rubber or other suitable material and may contain one or more cells. As shown, however, three cells are formed by means of two partitions A', each cell being rectangular in cross-section. There may be any suitable number of plates or electrodes $a$ and $b$ in each cell; but I have shown only three. I have also shown the plates as insulated by an absorbent material, such as blotting-paper $c$; but it will be understood that this material may be omitted and the electrolyte allowed free circulation between and around the plates. Each plate is provided at its upper end with an elongated lug $e$, having near its base a shoulder $e'$ and near its upper end another shoulder, $e^2$. The plates are so disposed in the cell that the two outside ones have their lugs opposite each other against one wall of the cell, while the lug of the intermediate plate is against the opposite wall of the cell.

$f$ and $g$ are two horizontal partitions of substantially the same configuration, each having three notches adapted to fit around the respective lugs $e$ of the plates. The partition $f$ rests upon the shoulders $e'$, while partition $g$ is spaced some distance above $f$ and rests upon the shoulders $c^2$ to form an intermediate chamber $h$ between the cell proper and the atmosphere. These partitions make close mechanical fits with the lugs $e$ and the walls of the cell, but for further security and sealing may have cement applied to the edges. Partition $f$ contains a central threaded opening $f'$ and to one side of the central opening a restricted or capillary opening $f^2$. The partition $g$ contains only a central opening, but of somewhat larger diameter than the opening $f'$.

$i$ is a plug having a reduced and threaded lower end $i'$, adapted to enter the threaded hole $f'$, and having a head $i^2$ with a notch for a screw-driver, by which it may be screwed into and out of place in the two partitions, the body of the plug fitting the hole in the partition $g$, while the head $i^2$ rests upon the upper surface of said partition. The plug is furthermore provided with a passage $i^3$, which establishes communication between the intermediate chamber $h$ and the atmosphere. Packing-washers $j$ are inserted between the plug and each of the partitions to prevent the escape of gas or liquid through the orifices in the partitions.

The size of the passage $f^2$ is such that the free liquid in the cell can pass through it only with the greatest difficulty and then very slowly; yet it is of sufficient capacity to allow gases generated in the cell to escape into the intermediate chamber $h$, whence they freely pass to the atmosphere through the hollow plug $i$. A battery so constructed can be handled even carelessly without the escape of liquid, for if the cell is allowed to rest upon its side or top it will require a long time before enough of it escapes into the intermediate chamber to enter and pass out through the passage $i^3$ in the plug, and it cannot injure the clothing or become otherwise obnoxious until the final escape through the plug. Before this can take place under ordinary circumstances the inverted position of the cell would be discovered and corrected, whereupon the small quantity of liquid that may have reached the intermediate chamber will flow back into the cell by the same passage through which it escaped. The intermediate chamber therefore becomes a trap for such liquid as would ordinarily escape by careless handling of the cell and insures the return of the liquid to the cell when abnormal conditions have been corrected.

The process of replenishing the solution of the cell is very simple, consisting merely in unscrewing and removing the plug $i$ and introducing the liquid by means of a dropping tube or syringe, the nozzle of which can be passed through the openings in both partitions, or the liquid can be poured into the intermediate chamber and allowed to flow through the openings in the partition $f$ into the cell. Were it not for the necessity of refilling the cell, the plug $i$ could be dispensed with and the passage $i^3$ placed in partition $g$.

It is obvious that the lugs on the electrodes need not penetrate both or either of the diaphragms, as the interconnection of the plates to establish the circuits can be accomplished inside of the cell and below the partitions, the essential feature of my invention being the formation of the trap.

Having described my invention, I claim—

1. In a battery-cell, the combination of the electrodes and electrolyte, the former having elongated lugs extending substantially to the top of the cell, two horizontal partitions spaced apart and fitting around said lugs and the walls of the cell and each provided with a passage, for the purpose set forth.

2. In an electric battery, the combination of a cell containing a number of electrodes each of which is provided with an upwardly-projecting lug, two horizontal partitions arranged in the upper part of the cell and supported upon said lugs and forming a closed space between them, and a plug passing through the upper partition and screwing into the lower, whereby by removing the same a filling-orifice is provided, said plug having a longitudinal passage extending from its outer end to a point about midway between the partitions to form a venting-passage for said inclosed space and capillary openings in the lower partition through which gases can pass from the cell into said inclosed space.

In witness whereof I subscribe my signature in presence of two witnesses.

MILLER REESE HUTCHISON.

Witnesses:
WALDO M. CHAPIN,
FRANK S. OBER.